United States Patent [19]
Lakshminarayan et al.

[11] Patent Number: 5,749,041
[45] Date of Patent: May 5, 1998

[54] METHOD OF FORMING THREE-DIMENSIONAL ARTICLES USING THERMOSETTING MATERIALS

[75] Inventors: Udaykumar Lakshminarayan; Kevin P. McAlea, both of Austin; Richard B. Booth, Pflugerville, all of Tex.

[73] Assignee: DTM Corporation, Austin, Tex.

[21] Appl. No.: 542,977

[22] Filed: Oct. 13, 1995

[51] Int. Cl.$^6$ .................................. B22F 1/02; B22F 3/26
[52] U.S. Cl. .................................. 419/2; 419/29; 419/35; 419/38; 419/54; 419/55
[58] Field of Search .................................. 419/36, 37, 35, 419/38, 2, 29, 54, 55

[56] References Cited

U.S. PATENT DOCUMENTS

| | | | |
|---|---|---|---|
| 4,247,508 | 1/1981 | Housholder | 264/219 |
| 4,863,538 | 9/1989 | Deckard | 156/62.2 |
| 4,944,817 | 7/1990 | Bourell et al. | 156/62.2 |
| 5,017,753 | 5/1991 | Deckard | 219/121.63 |
| 5,076,869 | 12/1991 | Bourell et al. | 156/62.2 |
| 5,156,697 | 10/1992 | Bourell et al. | 156/62.2 |
| 5,284,695 | 2/1994 | Barlow et al. | 428/206 |

FOREIGN PATENT DOCUMENTS

| | | |
|---|---|---|
| 0 416 852 A2 | 3/1991 | European Pat. Off. |
| 43 05 201 C1 | 4/1994 | Germany |

OTHER PUBLICATIONS

Hackh's Chemical Dictionary, p. 674, 1969.

*Primary Examiner*—Daniel J. Jenkins
*Attorney, Agent, or Firm*—Anderson, Levine & Lintel

[57] ABSTRACT

A method of fabricating articles, such as prototype parts and prototype tooling for injection molding, is disclosed. The method begins with the fabrication of the article in a "green" state by the selective laser sintering, or another additive thermal process, applied to a composite powder, preferably a powder of metal particles coated with a thermoplastic polymer. Both the green article and also an aqueous emulsion of a thermosetting material are then preheated to a temperature below the glass transition temperature of the thermoplastic polymer, and the green article is then infiltrated with the aqueous emulsion. The thermosetting material may be a thermosetting polymer with an appropriate cross-linking agent, or may be a cross-linking agent that will react with the thermoplastic binder polymer. After infiltration, the article is dried, and a rigid skeleton of a thermosetting material is now present within the structure of the article. Further processing may now be performed. The article may be heated beyond the decomposition temperature of the polymers so as to drive off the polymer and sinter the metal particles to one another; alternatively, a resin may be added to the article to form a metal-polymer composite article. High strength articles may thus be formed in a manner which preserves the dimensional accuracy of the article relative to its CAD representation.

17 Claims, 2 Drawing Sheets

METHOD OF FORMING THREE-DIMENSIONAL ARTICLES USING THERMOSETTING MATERIALS

BACKGROUND OF THE INVENTION

The field of rapid prototyping of parts has, in recent years, made large improvements in providing high strength, high density, parts for use in the design and pilot production of many useful articles. "Rapid prototyping" generally refers to the manufacture of articles directly from computer-aided-design (CAD) data bases in an automated fashion, as opposed to conventional machining of prototype articles from engineering drawings. As a result, the time required to produce prototype parts from engineering designs has reduced from several weeks, using conventional machinery, to a matter of a few hours.

One example of a rapid prototyping technology is the selective laser sintering process practiced by systems available from DTM Corporation of Austin, Tex. According to this technology, articles are produced in layerwise fashion from a laser-fusible powder that is dispensed one layer at a time. The powder is fused, or sintered, by the application of laser energy that is directed in raster scan fashion to those portions of the powder corresponding to a cross-section of the article. After the fusing of powder in each layer, an additional layer of powder is then dispensed, and the process repeated, with fused portions of later layers fusing to fused portions of previous layers (as appropriate for the article), until the article is complete. Detailed description of the selective laser sintering technology may be found in U.S. Pat. No. 4,863,538, U.S. Pat. No. 5,017,753, U.S. Pat. No. 5,076,869, and U.S. Pat. No. 4,944,817, all assigned to Board of Regents, The University of Texas System, and in U.S. Pat. No. 4,247,508 assigned to DTM Corporation, all incorporated herein by this reference. The selective laser sintering technology has enabled the direct manufacture of three-dimensional articles of high resolution and dimensional accuracy from a variety of materials including wax, polycarbonate, nylon, other plastics, and composite materials such as polymer coated metals and ceramics. Wax parts may be used in the generation of tooling by way of the well-known "lost wax" process. Examples of composite powder materials are described in U.S. Pat. No. 4,944,817, U.S. Pat. No. 5,156,697, and in U.S. Pat. No. 5,284,695, all assigned to Board of Regents, The University of Texas System, and incorporated herein by this reference.

In addition to the manufacture of prototype articles themselves, the selective laser sintering process is now also used in fabricating prototype tooling for injection molding, with expected tool life in excess of ten thousand uses. The production of such tooling by selective laser sintering conventionally uses a powder of metal particles coated with a polymer, from which a "green" part is fabricated by selective laser sintering of the polymer coating to binds the particles to one another. The green part is then heated to a temperature above the decomposition temperature of the polymer, which both drives off the polymer and also binds the metal substrate particles to one another to form the metal article. In the case where the article is a mold die for injection molding, the die is also impregnated with another metal, for example copper, to add strength, wear resistance, and tooling life.

According to another conventional approach, composite polymer-metal parts or tooling may be formed without subjecting the green part to a post-process anneal. In this technique, the green parts formed by the selective laser sintering of a polymer-coated metal powder are impregnated with a liquid resin. The resin is cross-linked, either at room temperature or at an elevated temperature, depending upon the resin chemistry, resulting in near-fully dense composite articles.

According to these prior techniques, thermoplastic polymers have been the preferred class of polymer coating in the powder, and thus the binder in the green part. This is because thermoplastic polymers are quite stable over long storage times, in contrast to thermosetting polymers which, as is well known, may react in storage over time. Accordingly, the selective laser sintering process conditions for thermoplastic polymers are more stable than are the conditions for thermosetting polymers. Examples of composite powders used in the selective laser sintering process are described in the above-referenced U.S. Pat. No. 5,284,695 and include UCAR-430 polymer and copolymers of methyl methacrylate and butyl acrylate, each which may be spray-dried onto a ceramic or metal substrate to form the composite powder.

A specific example of a conventional composite powder is an acrylate based thermoplastic (e.g., A639 available from Zeneca Inc.), having a glass transition temperature of 69° C., which is applied in a fluidized bed to uniformly coat a carbon steel powder (e.g., 1045 or 1080 steel) of mean particle size of 55 μm. The polymer content in this composite powder is approximately 1.0% by wt. (7% by vol.) of the composite powder.

As is well known in the art, the structural strength of the green article is an important factor in its utility, as weak articles cannot be safely handled during subsequent operations. Another important factor in the quality of a prototype article is its dimensional accuracy relative to the design dimensions. However, these factors of part strength and dimensional accuracy are generally opposed to one another, considering that the densification of the powder that occurs in the sintering of the post-process anneal also causes shrinkage of the article. For example, while the polymer content of the polymer coated steel powder described above could be increased from 1 wt. % in order to provide higher green part strength, the shrinkage of the part in post-process anneal would increase accordingly. As a result, it has been difficult to form highly accurate prototype articles via selective laser sintering, especially for use as injection mold tooling, as compromises between part strength and dimensional stability must be made in the design of the powder.

Other drawbacks of conventional composite powders incorporating thermoplastic polymer binders have also been observed. In the post-process anneal of green parts using such binders, creep deformation has been observed as the part is heated to a temperature above the glass transition temperature of the polymer binder, but below the decomposition temperature at which the binder is released. In this temperature range, which is between 69° C. and approximately 350° C. for the A639 thermoplastic polymer, the viscosity of the polymer decreases to such an extent that the steel substrate particles slide past one another under the force of gravity. Not only do the dimensions of the article change as a result of this creep deformation, but this dimensional change is not uniform in that taller features deform by a larger extent than do shorter features. This nonuniformity in deformation precludes the use of a constant shrinkage correction factor in the selective laser sintering fabrication of the green part, further exacerbating the difficulty of achieving dimensionally accurate articles of high density and strength.

Creep deformation has been observed to deform not only the height but also the shape of vertical features such as sidewalls. For example, vertical walls of mold cavities formed by selective laser sintering of polymer-coated metal powders, and having a thickness of 0.75 inches and a height of 1.5 inches, have been observed to bow outwardly as a result of creep deformation. The dimensional accuracy of the infiltrated final part is, of course, severely compromised by such deformation.

Distortion has also been observed in the fabrication of metal-polymer composite articles by the impregnation of a green part with a cross-linking resin. The cause of this distortion is the reaction of the cross-linking resin (e.g., an acrylate based thermosetting resin such as Resinol RTC, available from Loctite Company) with the thermoplastic binder polymer of the composite selective laser sintering powder. The thermosetting resin plasticizes the thermoplastic binder, causing the green part to lose shape during the impregnation process before the impregnating resin fully cross-links.

It is therefore an object of the present invention to provide a method of fabricating high density and high strength articles and tooling via selective laser sintering so as to provide improved dimensional control.

It is a further object of the present invention to provide such a method from a composite powder that has stable shelf life characteristics.

It is a further object of the present invention to provide such a method which may be used to fabricate metal articles and also composite metal-polymer articles.

It is a further object of the present invention to provide such a method in which any shrinkage that does occur in the fabrication of the article is substantially uniform.

It is a further object of the present invention to provide such a method that is especially beneficial in the fabrication of prototype tooling for injection molds.

Other objects and advantages of the present invention will be apparent to those of ordinary skill in the art having reference to the following specification together with the drawings.

SUMMARY OF THE INVENTION

The invention may be incorporated into a method of fabricating an article, such as a prototype part or a tooling for injection molding, by way of selective laser sintering. According to the present invention, a "green" part is formed by the selective laser sintering of a metal-polymer composite powder, in which the polymer binder is a thermoplastic polymer. Following its fabrication, the green article is infiltrated with a thermosetting material prior to heating the part. The thermosetting material may be an aqueous emulsion of a cross-linkable polymer with a cross-linking agent, or may instead be an aqueous emulsion of only the cross-linking agent. In the first case, the cross-linking agent reacts with the cross-linkable polymer in the infiltrant to form a rigid skeleton for the green article; in the second case, the cross-linking agent reacts with the polymer binder of the green article to form the rigid skeleton. Following the formation of the rigid skeleton, the article may be heated to decompose the polymer and sinter the metal substrate particles; according to one alternative embodiment of the invention, a polymer resin may impregnate the article to form a fully-dense metal-polymer composite article.

DETAILED DESCRIPTION OF THE PREFERRED EMBODIMENTS

According to the preferred embodiments of the present invention, three-dimensional articles of complex shapes may be made with high dimensional accuracy and good part strength both in its green state and also as a finished article. In addition, the present invention allows the use of thermoplastic polymers as the binder coating of the composite powder, resulting in good shelf life characteristics for the selective laser sintering powder. It is to be understood that, while the present invention is particularly useful in the fabrication of prototype injection molds and tooling, the present invention may also be used to advantage in the fabrication of prototype parts, such as used in the modeling of mechanical systems. Indeed, it is contemplated that the selective laser sintering process and the method of the present invention may be used to manufacture end use articles and parts therefor, particularly in custom or very limited runs, as economics permit. As such, the use of the term "article" herein below will be used to refer either to a part (prototype or end-use), or to tooling for injection molding, thus encompassing various eventual uses of the article.

Figure 1:
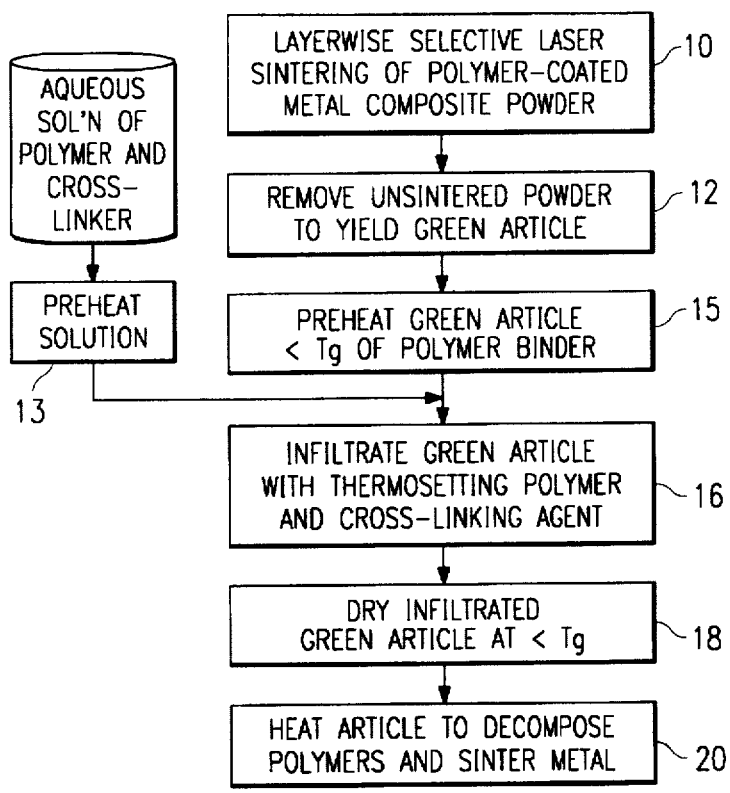
FIG. 1 is a flow diagram illustrating a method of fabricating an article according to a first preferred embodiment of the invention.

Referring now to FIG. 1, a method of fabricating an article according to a first preferred embodiment of the invention will now be described in detail. According to this embodiment of the invention, the method begins with process 10, which is the selective laser sintering of a composite metal-polymer binder to form a "green" article. The term "green" refers to the intermediate state of the article, prior to its densification as will be described herein below. The composite powder used in process 10 according to this embodiment of the invention is a polymer-coated metal powder where the polymer coating, or binder, is a thermoplastic polymer that fully covers the metal substrate particles. A preferred example of a composite powder useful in connection with this embodiment of the invention, and now conventionally used in the selective laser sintering process, has a substrate of low carbon steel, such as spherical particles of 1045 or 1080 steel having a mean diameter of on the order of 55 μm, coated with an acrylate-based thermoplastic polymer, such as A639 available from Zeneca Inc. The polymer binder is preferably applied to the metal powder substrate particles by way of a conventional fluidized bed technique, so as to fully coat the steel particles. For purposes of the present invention, the preferred polymer content of the composite powder is approximately 1 wt. %, which corresponds to 7 vol. %.

Alternatively, the powder may be a mixture of the high temperature material such as a metal or ceramic and the polymer binder. However, the coated powder described hereinabove is preferred, as it minimizes the polymer content of the green article and thus the extent of shrinkage upon post-process anneal.

Selective laser sintering process 10 is preferably performed in a modern selective laser sintering apparatus, such as the SINTERSTATION® 2000 system available from DTM Corporation. As described in the above-referenced patents, process 10 fabricates the green article in a layerwise fashion, by dispensing a thin layer of the powder over a target surface, preferably in a controlled environment, and then applying laser energy to selected locations of the powder layer to fuse, or sinter, the powder thereat. According to the present invention, where the powder is a polymer-coated metal powder, the powder particles are fused to one another by the melting and cooling of the polymer binder, rather than by sintering of the metal substrate particles (which would require very high laser power). The selected locations of the powder layer correspond to those portions of the layer in which the article is to be formed, as defined by a computer-aided-design (CAD) data base representation of the article. After the selective fusing of a layer, a subsequent layer is disposed over the previously processed layer, and the selective fusing is repeated in the new layer at locations of the layer corresponding to the CAD "slice" of the article to be formed therein. Those portions of a layer that overlie fused portions of the powder in the prior layer are bonded to the fused portions in the prior layer upon sintering, such that a solid article results. The unfused powder in each layer serves as a support medium for subsequent layers, enabling the formation of overhanging elements in the article. As a result of process 10, the green article is formed to the desired size and shape.

It is contemplated that the particular settings and operating parameters of the selective laser sintering system used in process 10 may be readily selected by one of ordinary skill in the art. These parameters include such items as the laser power, laser scan rate, ambient chamber temperature, layer thickness and the like. Typically, the values of these operating parameters are optimized for a given commercially-available powder, such as the polymer-coated metal powder described above, according to documentation provided by the system manufacturer.

Other thermal-based additive processes may alternatively be used to form the green article. For example, it is contemplated that process 10 may be performed by the layer-wise masked exposure of the composite powder to light, so that the portions of the powder to be fused are exposed to the light and the unfused portions are masked therefrom.

Upon completion of process 10, process 12 is then performed to remove the unfused or unsintered powder from around the article in the conventional manner. Such removal is commonly referred to as "rough break-out", and generally involves the mechanical removal of the unfused powder to yield the green article. Further surface finishing of the green article may be performed at this time, if desired.

According to this first preferred embodiment of the invention, an infiltrant containing a thermosetting polymer and a corresponding cross-linking agent is to be applied to the green article. Preferably, the solids content of the polymer emulsion is in the range from 0.25 wt. % to 20.0 wt %. The upper limit on the solids content in the emulsion is to prevent undue increases in the polymer content of the infiltrated green article, so that defects due to excess polymer content do not occur upon subsequent thermal processing, as will described below. A preferred class of infiltrants is an aqueous emulsion of a BMA-styrene copolymer and its corresponding cross-linking agent. A specific example of such an aqueous emulsion, useful for the case in which the polymer binder of the powder is A369, is an aqueous emulsion of 7 wt. % A622 copolymer, available from Zeneca Inc., in combination with 3 wt. % Cytec 385, which is a melamine formaldehyde cross-linker resin available from Cytec Industries.

It is contemplated that other thermosetting polymers may also be used in the present invention, such as phenolic-based polymers, epoxy-based polymers (an example of which is the EPI-REZ Resin WD 510 polymer available from Shell Chemical Company), and urethane-based polymers (an example of which is the Neorez R-9000 series available from Zeneca); in each case, of course, the appropriate cross-linking agent will be included in the emulsion.

The use of aqueous emulsions or solutions as the infiltrant of the green article is highly preferred, given the need for dimensional accuracy of the eventual finished article. If, for example, liquid polymers were used as the infiltrant of the green article, the polymer content in the infiltrated green article would be so large (e.g., on the order of 11 wt. %) as to cause risk of blisters, cracks and other defects upon decomposition of the binder. Accordingly, it has been observed that solutions or emulsions bearing the thermosetting polymer are preferred, as infiltration will not unduly increase the polymer content of the infiltrated green article. Further, it has been observed that organic solvents, such as methanol or toluene, generally cannot be used as the medium in the polymer solution, as they will react with and plasticize the thermoplastic binder of the green article. As such, aqueous emulsions of the polymer and cross-linking agent are used as the delivery vehicle for thermosetting polymers according to this embodiment of the invention.

As noted above, thermosetting polymers may react over time during storage, so as to be not suitable for use as the polymer binder in a composite selective laser sintering powder. However, the aqueous emulsions of thermosetting polymers are useful as the infiltrant according to this embodiment of the invention, as the characteristics of the thermosetting polymers do not change over time while in solution. Furthermore, any change in the characteristics of the thermosetting polymers do not of course affect the selective laser sintering process, since the thermosetting polymers are only applied to the green article, and are not constituents of the powder subjected to selective laser sintering.

According to this embodiment of the invention, depending upon the composition of the aqueous emulsion, preheating of both the infiltrant and the green article may be desired, to assist the infiltration process. As shown in FIG. 1, the aqueous emulsion of the infiltrant is preheated, in process 13, and the green article is also preheated, in process 15. The temperature to which the aqueous emulsion and green article are each preheated is preferably below the glass transition temperature ($T_g$) of the polymer binder of the green article, to avoid creep deformation during preheating of the article or during infiltration of the green article by the preheated emulsion. In the above-described example, where the thermoplastic binder is A639, the preheating should be below the glass transition temperature of 69° C. It has been observed that the preheating of the infiltrant and the green article greatly assists infiltration process 16, which will now be described.

After preheating processes 13, 15, process 16 is performed in which the green article is infiltrated with the aqueous emulsion of thermosetting polymer and cross-linking agent described hereinabove. The preferred technique for effecting such infiltration is to place the preheated green article into preheated aqueous emulsion of the infiltrant, and to maintain the green article therein for a selected time. Typically, the infiltrant will be wicked into the green article so that it is unnecessary to fully immerse the article into the emulsion. The article is kept in the infiltrant emulsion for several minutes, until the green article has been fully infiltrated; this saturated condition is readily apparent upon visual inspection.

After the infiltration of process 16, the infiltrated green article is dried in process 18 to drive off the water medium of the aqueous emulsion. Drying process 18 is preferably also performed at a temperature below the glass transition temperature of the thermoplastic polymer binder of the green article, again to prevent creep deformation. For the example where A639 serves as the polymer binder, drying may take place at a temperature of about 50° C., after removal of the infiltrated green article from the aqueous emulsion of infiltrant. During the drying process, the cross-linking agent will react with the thermosetting polymer of the infiltrant, and will harden to produce a rigid skeleton for the article. Once the rigid skeleton is formed about the microstructure of the green article, the green article will generally have improved structural strength due to the cross-linked polymer. The actual strength of the article will depend upon the amount and the chemistry of the infiltrant and also the drying temperature; for the example described above, three-point bending strengths of approximately 400 psi have been observed. This increase in green part strength not only makes the part more robust for subsequent processing, but also enables the green articles to be safely shipped.

The decomposition anneal of process 20 is next performed according to this embodiment of the invention, in which the article is subjected to a high temperature anneal. Process 20 is generally performed by subjecting the article to a nitrogen or nitrogen-hydrogen blend atmosphere at an elevated temperature, above both the decomposition temperature of the thermoplastic polymer binder of the composite powder from which the green article was formed, and also above the decomposition temperature of the cross-linked thermosetting polymer. At this elevated temperature, both the thermoplastic polymer binder of the composite powder and also the cross-linked thermosetting polymer of the infiltrant decompose and are driven off from the article. After this decomposition, or debonding, of the polymers, the temperature to which the article is subjected is increased further to the sintering temperature of the metal (e.g., above 700° C.), so that the metal particles are sintered to one another to form the finished metal article. For the above example, where the green article was formed from a powder containing the thermoplastic polymer binder A369 and infiltrated with an emulsion of A622 polymer and Cytec 385 cross-linker, process 20 should be carried out first at a temperature of 350° C. for on the order of five hours, considering that cross-linked A622 polymer decomposes at temperatures between 300° C. and 400° C.; this is followed by heating the article to a temperature above 700°; for example by ramping of the temperature to a temperature of approximately 1000° C. for approximately eight hours, to effect the metal sintering. Upon completion of process 20 according to this embodiment of the invention, a metal article having the shape and dimensions substantially matching that of the green article is yielded.

If desired, the metal article may now be impregnated with another metal, such as copper, as is conventional for the preparation of the final part or tooling. This impregnation thus results in a fully-dense article suitable for high wear use such as injection molding.

According to this embodiment of the invention, therefore, the rigid skeleton provided by the cross-linked thermosetting polymer allows the article to retain its shape and dimensional characteristics during decomposition, and prevents creep deformation despite the decreasing viscosity of the thermoplastic polymer as the temperature is raised. As a result, the method of this embodiment of the invention allows use of a thermoplastic polymer coating over metal substrate particles in the selective laser sintering powder, thus providing a powder with high shelf life stability. This benefit is obtained in a manner which allows the green article to be fabricated with a high degree of dimensional accuracy and precision, as the effects of creep deformation are precluded by the rigid skeleton formed by the cross-linked thermosetting polymer infiltrant. Furthermore, since the polymer content of the green article is minimized, the shrinkage that occurs upon decomposition and sintering is also minimized.

Figure 2:
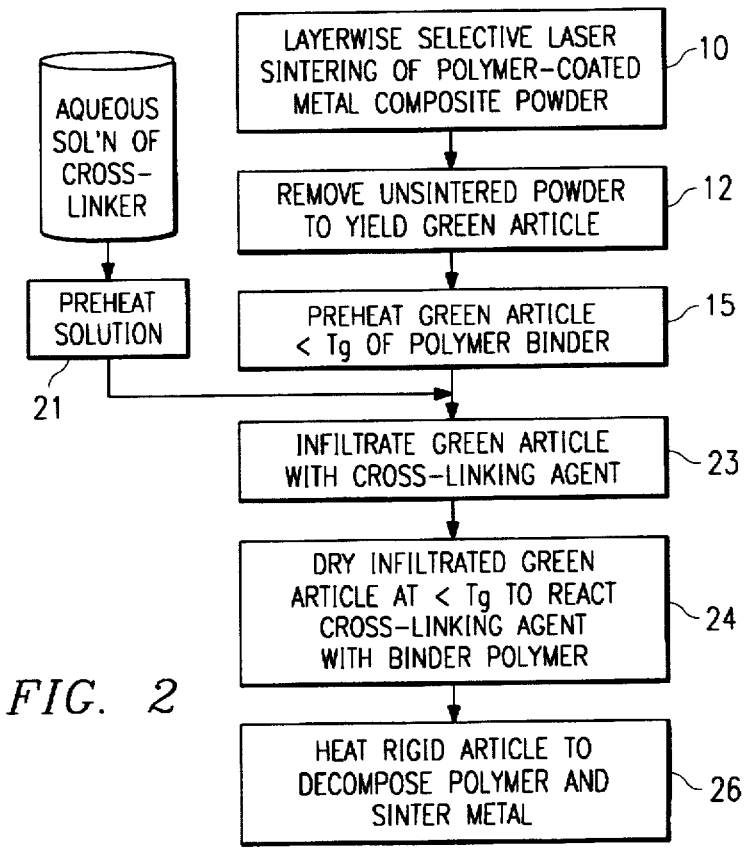
FIG. 2 is a flow diagram illustrating a method of fabricating an article according to a second preferred embodiment of the invention.

Referring now to FIG. 2, a method of fabricating a metal article according to another preferred embodiment of the invention will now be described in detail, with the same processes as those shown in FIG. 1 referred to by the same reference numerals. As shown in FIG. 2, the method begins with process 10, which is the selective laser sintering formation of the green article from a composite powder, preferably a metal substrate coated with thermoplastic polymer as described hereinabove relative to FIG. 1. Following process 10, the unfused or unsintered powder is removed from the green article in process 12, as before.

According to this embodiment of the invention, the green article is to be infiltrated with an aqueous emulsion of a cross-linking agent that will subsequently react with the polymer binder of the green article. Preferred examples of cross-linking agents useful according to this embodiment of the invention include Cytec 385, which is a melamine formaldehyde cross-liking resin available from Cytec Industries, and CX 100, which is a polyfunctional aziridine resin available from Zeneca Resins. A preferred example of the aqueous emulsion of the cross-linking agent is a 1 wt. % solution of the Cytec 385 cross-linking resin. It is contemplated that other cross-linking agents that will react with the thermoplastic polymer of the composite powder used in the selective laser sintering process may also be utilized in this embodiment of the present invention.

As in the method described hereinabove relative to FIG. 1, it is preferred that both the green article and also the infiltrant should be preheated prior to the infiltration of the green article by the cross-liking agent. In fact, it has been observed that a 1% solution of Cytec 385 resin may not infiltrate a green article at room temperature. Accordingly, as shown in FIG. 2, the green article is preheated to a temperature below the glass transition temperature of the polymer binder in process 15, and the aqueous emulsion of the cross-linking agent is preheated to a similar temperature in process 21.

Process 23 is then performed, in which the green article is infiltrated with the aqueous solution of the cross-linking agent. As in the previously described embodiment of the invention relative to FIG. 1, this infiltration may be performed merely by setting the preheated green article into a volume of the aqueous emulsion, as the emulsion will "wick" into the green article until saturation, which typically takes a few minutes and is easily observable.

Once the infiltration of process 23 is complete, the infiltrated green article is then dried, in process 24, at a temperature below the glass transition temperature of the thermoplastic polymer binder of the green article. During this drying of process 24, the cross-linking agent in the infiltrant reacts with the polymer binder of the green article, creating a rigid skeleton for the infiltrated green article. In this example, the rigid skeleton is formed of the cross-linked polymer binder and will not undergo creep deformation upon the article being heated above the glass transition temperature of the polymer binder. Again, the drying of process 24 should take place at a temperature below the glass transition temperature of the polymer binder, for example at 50° C. when A639 polymer is used, so that creep deformation does not occur prior to the cross-linking reaction. A green article with increased structural strength is thus provided according to this embodiment of the invention.

Following the formation of the rigid skeleton in process 24, the green article with the rigid skeleton of the cross-linked polymer is heated first to a temperature above the decomposition temperature of the polymer, in order to decompose and drive off the polymer, and then to a sufficient temperature to sinter the metal substrate particles to one another, as described hereinabove. This heating is performed in an inert ambient atmosphere, such as in nitrogen or in a nitrogen-hydrogen blend, to remove oxides already present, and to prevent further oxidation of the metal during sintering. Impregnation of the metal article with another metal, such as copper, may now be performed if desired. As in the embodiment described hereinabove relative to FIG. 1, the method of FIG. 2 results in a metal article that was formed by the selective laser sintering of a composite powder of metal substrate particles coated with thermoplastic polymer, so as to have excellent shelf life characteristics, while still allowing for excellent dimensional stability through the subsequent high temperature sintering and polymer decomposition steps. In addition, as in the previously described embodiment, the polymer content of the green article is minimized to also minimize the shrinkage of the article in decomposition and sintering.

Figure 3:
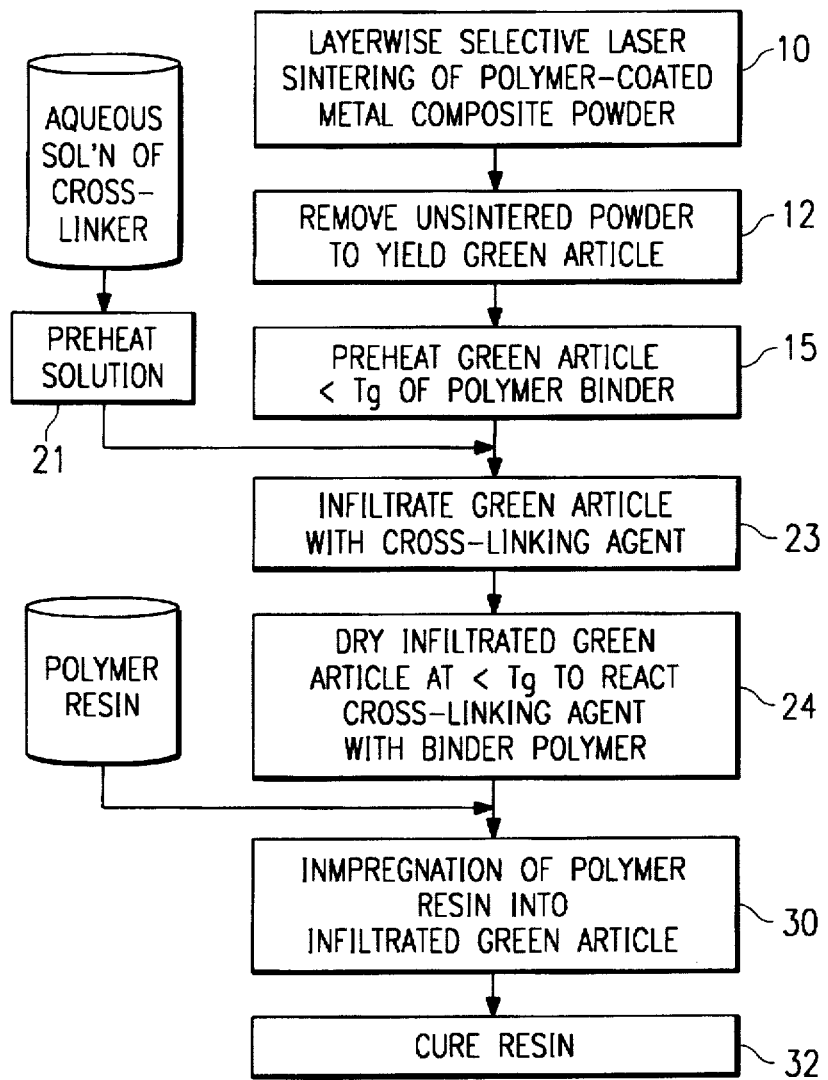
FIG. 3 is a flow diagram illustrating a method of fabricating an article according to a third preferred embodiment of the invention.

Referring now to FIG. 3, another embodiment of the invention will now be described, in which a metal-polymer composite article will be fabricated. The process of FIG. 3 includes the same process steps as described hereinabove relative to FIG. 2, up to and including process 24 in which the infiltrated green part is dried at a temperature below the glass transition temperature of the polymer binder of the green article. As before, the green article fabricated by selective laser sintering now has a rigid skeleton formed of the thermoplastic polymer binder itself, after reaction with the cross-linking agent, so that creep deformation upon higher temperature operations is prevented.

According to this embodiment of the invention, process 30 is next performed, in which a polymer resin is impregnated into the article; this polymer resin is intended to fill the interstices among the polymer coated particles of the article, resulting in a fully-dense metal-polymer composite article. A preferred example of the polymer resin, according to this embodiment of the invention, is Resinol RTC. The impregnation of the polymer resin is performed, similarly as in infiltration process 24, merely by placing the article into a volume of the resin and allowing the resin to wick up into the article until saturation. Following the impregnation of process 30, the polymer resin is cured in the appropriate manner in process 32, generally by heating the impregnated article, thus forming a fully-dense metal-polymer composite article.

As in the embodiments of the invention described hereinabove relative to FIGS. 1 and 2, the method according to this embodiment of the invention allows the formation of a high strength article, in this case a metal-polymer composite, via the selective laser sintering of a composite powder of metal and thermoplastic polymer. The eventual metal-polymer composite article is formed in an improved manner through the formation of a rigid skeleton within the article, such that the polymer resin does not plasticize the polymer binder of the green article.

According to each of the embodiments of the present invention, high-strength articles are fabricated of wear-resistant materials, such as steel or metal-polymer composites, which are thus suitable for use as prototype injection mold tooling with reasonable lives (on the order of one to ten thousand uses). The articles may be fabricated with high precision, according to this embodiment of the invention, and in such a manner so as to not be vulnerable to creep deformation and other distortion effects.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of fabricating an article, comprising the steps of:

forming a green article by the selective sintering of a composite metal powder having a thermoplastic polymer binder;

infiltrating the green article with an aqueous emulsion of a thermosetting polymer material; and drying the infiltrated green article.

2. The method of claim 1, further comprising:

after the drying step, heating the article to a first temperature to decompose the polymer binder.

3. The method of claim 2, wherein the composite powder further comprises metal particles;

and wherein the heating step further comprises heating the article to a second temperature, above the first temperature, to sinter the metal particles to one another.

4. The method of claim 3, wherein the aqueous emulsion comprises:

a thermosetting polymer; and a cross-linking agent for cross-liking the thermosetting polymer.

5. The method of claim 4, further comprising:

after the heating step, impregnating the article with a metal.

6. A method of fabricating an article, comprising the steps of:

forming a green article by the selective sintering of a composite metal powder having a thermoplastic polymer binder;

infiltrating the green article with an aqueous emulsion comprising a cross-linking agent for cross-linking the thermoplastic polymer binder; and drying the infiltrated green article.

7. The method of claim 6, further comprising:

after the drying step, heating the article to decompose the polymer binder.

8. The method of claim 6, further comprising:

after the drying step, impregnating the article with a polymer resin; and curing the resin.

9. A method of fabricating an article, comprising the steps of:

forming a green article by the selective sintering of a composite metal powder having a thermoplastic polymer binder;

preheating the aqueous emulsion;

after the preheating step, infiltrating the green article with an aqueous emulsion of a thermosetting material; and drying the infiltrated green article.

10. A method of fabricating an article, comprising the steps of:

forming a green article by the selective sintering of a composite metal powder having a thermoplastic polymer binder;

preheating the green article to a temperature below the glass transition temperature of the polymer binder;

after the preheating step, infiltrating the green article with an aqueous emulsion of a thermosetting material; and drying the infiltrated green article.

11. The method of claim 10, further comprising:

prior to the infiltrating step, preheating the aqueous emulsion to a temperature below the glass transition temperature of the polymer binder.

12. An article fabricated by the process comprising:

forming a green article by the selective sintering of a composite metal powder having a thermoplastic polymer binder;

infiltrating the green article with an aqueous emulsion comprising a thermosetting polymer and a cross-linking agent for cross-linking the thermosetting polymer; and drying the infiltrated green article.

13. The article of claim 12, wherein the process further comprises:

after the drying step, heating the article to a first temperature to decompose the polymer binder.

14. The article of claim 13, wherein the composite powder further comprises metal particles;

and wherein the heating step further comprises heating the article to a second temperature, above the first temperature, to sinter the metal particles to one another.

15. The article of claim 14, wherein the process further comprises:

after the heating step, impregnating the article with a second metal.

16. An article fabricated by the process comprising:

forming a green article by the selective sintering of a composite metal powder having a thermoplastic polymer binder;

infiltrating the green article with an aqueous emulsion of a cross-linking agent for cross-linking the thermoplastic polymer binder; and drying the infiltrated green article.

17. The article of claim 16, wherein the process further comprises:

after the drying step, impregnating the article with a polymer resin; and curing the resin.

* * * * *